(12) United States Patent
Miura

(10) Patent No.: US 6,377,279 B1
(45) Date of Patent: Apr. 23, 2002

(54) IMAGE GENERATION APPARATUS AND IMAGE GENERATION METHOD

(75) Inventor: Katsuhiro Miura, Tokyo (JP)

(73) Assignee: Namco Limited, Tokyo (JP)

( * ) Notice: Subject to any disclaimer, the term of this patent is extended or adjusted under 35 U.S.C. 154(b) by 0 days.

(21) Appl. No.: 09/388,662

(22) Filed: Sep. 2, 1999

(30) Foreign Application Priority Data

Sep. 3, 1998 (JP) ............................................. 10-249874

(51) Int. Cl.$^7$ ................................................. G09G 5/00
(52) U.S. Cl. ........................ 345/635; 345/634; 345/619
(58) Field of Search ................................. 345/433, 435, 345/113, 114, 115, 634, 635, 639, 640, 619

(56) References Cited

U.S. PATENT DOCUMENTS 5,515,489 A * 5/1996 Yaeger ........................ 345/634

FOREIGN PATENT DOCUMENTS

| JP | 08185543 A | 7/1996 | ............ G06T/15/50 |
| JP | 09050541 A | 2/1997 | ............ G06T/15/50 |
| JP | 10-187951 | 7/1998 | ............. G06T/1/00 |

* cited by examiner

Primary Examiner—Matthew Luu
(74) Attorney, Agent, or Firm—Fitch, Even, Tabin & Flannery

(57) ABSTRACT

When it is previously known that two objects A and B do not overlap on a display screen, if polygon depiction order is set as shown below, there is almost no possibility that depiction data of overlapped addresses exist in the process of translucent calculation. Order (1) polygon a-1, order (2) polygon b-1, order (3) polygon a-2, order (4) polygon b-2, order (5) polygon a-3, order (6) polygon b-3, order (7) polygon a-4, order (8) polygon b-4, thereby providing an image generation apparatus, an image generation method and a storage medium storing an image generation program enabling exact and rapid translucent processing even with a simple construction.

9 Claims, 5 Drawing Sheets

IMAGE GENERATION APPARATUS AND IMAGE GENERATION METHOD

This application is based on patent application Ser. No. 10-249874 (1998) filed Sep. 3, 1998 in Japan, the content of which is incorporated hereinto by reference

BACKGROUND OF THE INVENTION

1. Field of the Invention

The present invention relates to an image generation apparatus, an image generation method and a storage medium suitable for depicting an image such as a translucent polygon.

More specifically, the present invention relates to an image generation apparatus, an image generation method and a storage medium for making rendering of a plurality of objects, under a condition that the plurality of objects displayed on a screen are not displayed overlappingly with each other.

2. Description of the Related Art

As one of prior art CG (computer graphic) techniques, there has been performed formation of a three-dimensional image using a plurality of polygons. In this kind of technique, since formation of a translucent object is useful, there is known a translucent processing technology as described, for example, in Japanese Patent Application Laying-open Nos. 10-187951 (corresponding to U.S. Ser. No. 09/142,658), 8-185543 and 9-50541. The disclosure of U.S. Ser. No. 09/142,658 is incorporated herein by reference.

FIG. 5 shows a conventional pipeline construction used for making translucent processing to polygon by the prior art. Referring to the figure, a color calculation part 50 for making translucent processing to polygon is inputted with a background reference data read for every pixel from a frame buffer 52, in addition to an image depiction data. When making translucent processing to polygon using this color calculation part 50, the background reference data for translucent processing is read in advance from the frame buffer 52 before writing of all pixel data to the frame buffer 52 is completed. Then, the value of the background reference data multiplied by a first coefficient and the value of the image depiction data multiplied by a second coefficient are summed, and the result is again written in the frame buffer 52 as a pixel data of the same address. Thus, the desired translucent processing to polygon is performed.

However, in the prior art translucent processing technology exemplified in FIG. 5, when an image depiction data of an overlapped address exists in the data under processing in the color calculation part 50, there is a problem in that a color calculation result including exact translucent processing is not obtained.

As a result, problems may occur such as unnecessary color irregularities produced in the polygon or unnatural color usage.

Further, if elimination of the above problem is attempted, an additional wait time for translucent processing is required, which is an obstacle to high-speed processing.

In particular, when a plurality of objects exist on the same screen, because it is necessary to make translucent processing successively for each object, the above problem occurs in proportion to the number of objects.

SUMMARY OF THE INVENTION

In view of the above points, an object of the present invention is to provide an image generation apparatus, an image generation method and a storage medium storing an image generation program which are possible to make exact and rapid translucent processing even with a simple construction.

In the first aspect of the present invention, there is provided an image generation apparatus for making rendering of a plurality of objects, under a condition that the plurality of objects displayed on a screen are not displayed overlappingly with each other, characterized by comprising:

first input means for taking in a first data representing a first object;

when an area to be translucent processed exists in the first object, determination means for determining whether or not the area to be translucent processed exists overlappingly for a same pixel to be processed;

when an affirmative determination is made by the determination means, second input means for taking in a second data representing a second object to form a set with the first object; and rearrangement means for rearranging the first object and the second object so that depiction processing of the first object and the second object is performed in alternation, wherein rendering processing is performed on the basis of the rearranged data.

Here, when a negative determination is made by the determination means, rendering processing may be immediately executed without passing through the second input means and the rearrangement means.

The determination means may perform determination according to specific information previously set for each object;

In the second aspect of the present invention, there is provided an image generation method for making rendering of a plurality of objects, under a condition that the plurality of objects displayed on a screen are not displayed overlappingly with each other, comprising:

a step for taking in a first data representing a first object;

when an area to be translucent processed exists in the first object, a step for determining whether or not the area to be translucent processed exists overlappingly for a same pixel to be processed;

when an affirmative determination is made by the determination step, a step for taking in a second data representing a second object to form a set with the first object;

a step for rearranging the first object and the second object so that depiction processing of the first object and the second object is performed in alternation, and a step for performing rendering processing on the basis of the rearranged data.

Here, when a negative determination is made by the determination step, rendering processing may be immediately executed.

The determination step may perform determination according to specific information previously set for each object.

In the third aspect of the present invention, there is provided a computer useable medium recorded with a program for executing steps in a computer for making rendering of a plurality of objects, under a condition that the plurality of objects displayed on a screen are not displayed overlappingly with each other, the steps comprising:

a step for taking in a first data representing a first object;

when an area to be translucent processed exists in the first object, a step for determining whether or not the area to be translucent processed exists overlappingly for a same pixel to be processed;

when an affirmative determination is made by the determination step, a step for taking in a second data representing a second object to form a set with the first object;

a step for rearranging the first object and the second object so that depiction processing of the first object and the second object is performed in alternation, and a step for performing rendering processing on the basis of the rearranged data.

In the fourth aspect of the present invention, there is provided a computer data signal embodied in a digital data stream including a program data for executing steps in a computer for making rendering of a plurality of objects, under a condition that the plurality of objects displayed on a screen are not displayed overlappingly with each other, the steps comprising:

a step for taking in a first data representing a first object;

when an area to be translucent processed exists in the first object, a step for determining whether or not the area to be translucent processed exists overlappingly for a same pixel to be processed;

when an affirmative determination is made by the determination step, a step for taking in a second data representing a second object to form a set with the first object;

step for rearranging the first object and the second object so that depiction processing of the first object and the second object is performed in alternation, and a step for performing rendering processing on the basis of the rearranged data.

In the fifth aspect of the present invention, there is provided a computer data signal embodied in carrier wave including a program data for executing steps in a computer for making rendering of a plurality of objects, under a condition that the plurality of objects displayed on a screen are not displayed overlappingly with each other, the steps comprising:

a step for taking in a first data representing a first object;

when an area to be translucent processed exists in the first object, a step for determining whether or not the area to be translucent processed exists overlappingly for a same pixel to be processed;

when an affirmative determination is made by the determination step, a step for taking in a second data representing a second object to form a set with the first object;

a step for rearranging the first object and the second object so that depiction processing of the first and the second object is performed in alternation, and a step for performing rendering processing on the basis of the rearranged data.

As described above, with the present invention, even by a simple construction, it is possible to provide an image generation apparatus, an image generation method and a storage medium storing an image generation program enabling exact and rapid translucent processing.

That is, with the present invention, when a depiction data of overlapping address exists in data under color calculation, the prior art problem that a color calculation result including exact translucent processing is not obtained can be prevented. Further, with the present invention, since it is not necessary to construct a more complex color calculation processing circuit, reduction of cost and processing time can be achieved.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described in detail with reference to the drawings.

Figure 1:
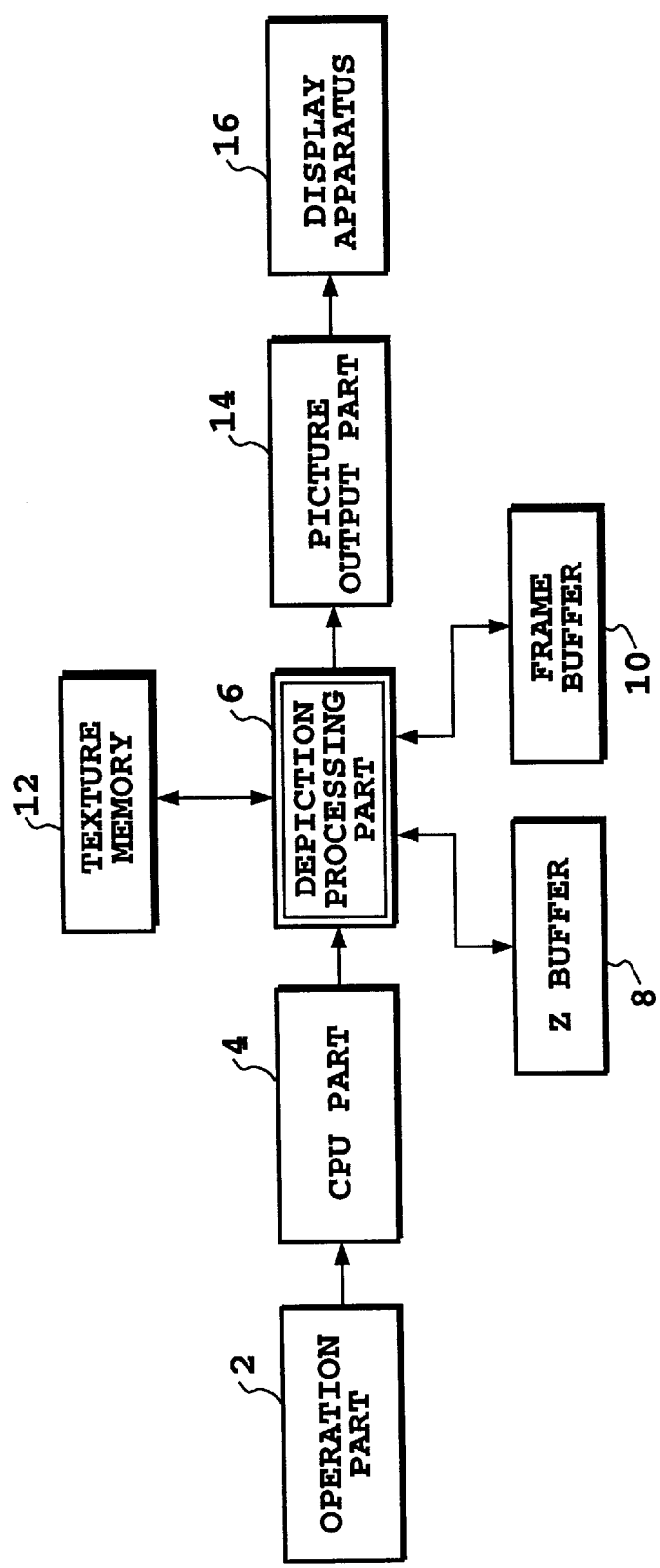
FIG. 1 is a block diagram showing the entire construction of the image generation apparatus applied with the present invention.

FIG. 1 is a block diagram showing an example of entire construction of image generation apparatus applied with the present invention, in which numeral 2 indicates an operation part including a keyboard, a mouse or the like, 4 is a CPU part for sending a polygon data to a subsequent stage in accordance with a predetermined sequence such as a game, 6 is an image depiction processing part for executing image depiction processing including geometrical calculation, 8 is a Z buffer for performing hidden surface removal of polygon according to a Z buffer method, 10 is a frame buffer, 12 is a texture memory for storing texture information, 14 is a picture output part for visualizing a picture, and 16 is a display apparatus such as a CRT.

Next, translucent processing of polygon will be described.

The image depiction processing part 6 produces a translucent polygon using a predetermined algorithm on the basis of background reference data taken in from the frame buffer 10 and a polygon data newly outputted from the CPU part 4. In the translucent polygon, brightness of color information R, G, or B component thereof is represented as formula (1), where a background color obtained from the background reference data is Rbg, Gbg, or Bbg and a color of translucent polygon (visible surface) obtained from the image depiction data is Rp, Gp, or Bp. Hereinafter, R, G, and B indicate brightnesses of color components after translucent processing. Formulae for G and B are omitted since they are similar to the formula of R.

$$R = Rbg*\alpha + Rp*\beta \qquad (1)$$

When $1 \geq \beta \geq 0$, and $\alpha = 1-\beta$, calculation is made by fixing a, and varying only $\beta$. $\beta$ is a translucent coefficient corresponding to a transparent polygon which is a visible surface. If $\beta=0$, the surface of that transparent polygon is invisible. If $\beta=1$, that surface is opaque, and the background is invisible. When the polygon is written in the order of depth priority in the frame buffer 10, Rbg, Gbg and Bbg coincide with the value of the frame buffer 10, and Rp, Gp and Bp coincide with the present surface to be written thereafter. The above calculation is performed in the pixel unit.

The method of formula (1) is referred to as a blend (interpolation calculation) method (blending technique), however, alternatively, a filter method (filtering technique) may be used as a second method to produce a translucent polygon. Formulae for G and B are omitted since they are similar to the formula of R. This calculation is also performed in the pixel unit.

$$R = Rbg * \alpha' \qquad (2)$$

where $\alpha'$ is a transparent coefficient (or translucent coefficient) in the filtering technique.

Further as a third method, an addition method (addition technique) as shown in formula (3) can also be employed. Formulae for G and B are omitted since they are similar to the formula of R. This calculation is also performed in the pixel unit.

$$R = Rbg + \alpha'' * Rplus \qquad (3)$$

where $\alpha''$ is a translucent coefficient in the addition technique, and Rplus is an addition value of color information.

Which technique of the above is adopted may be determined according to the picture effect. That is, according to the type of picture representation to be obtained, one of the addition technique and the blending technique or a combination of both can be employed.

After the completion of write operation to the frame buffer 10 as described above, the image is displayed by the display apparatus 16 through the picture output part 14 and, at the same time, a new image depiction operation for a next display image is continuously executed. It is needless to say that a printer or an external memory or the like (not shown) may be connected along with or in substitution for the display apparatus 16.

Figure 2:
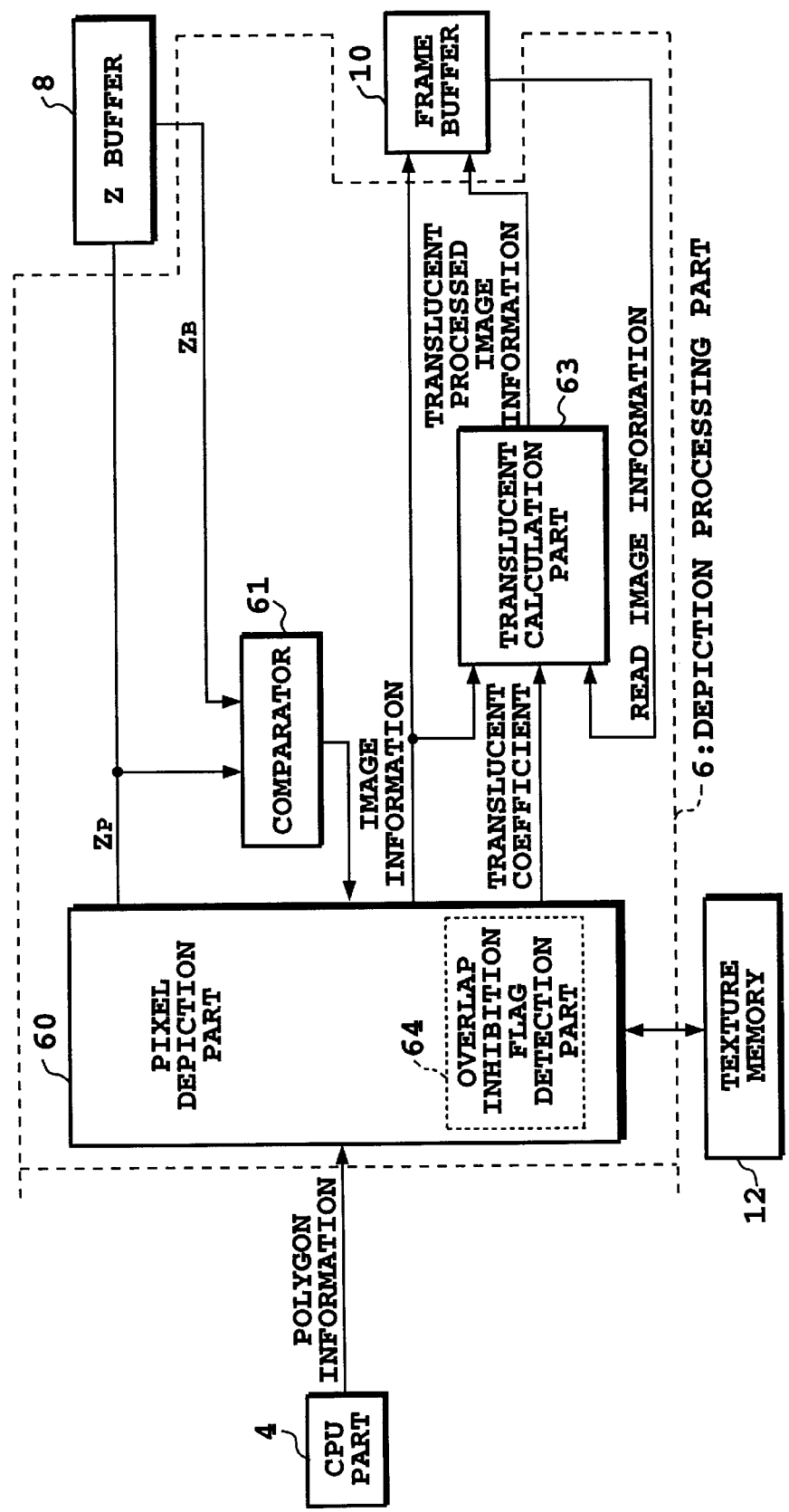
FIG. 2 is a detailed circuit diagram of an image depiction processing part 6 shown in FIG. 1.

FIG. 2 shows in detail part of the image depiction part 6 suitable for executing the above-described translucent processing as shown in FIG. 1. In the figure, numeral 60 indicates a pixel depiction part, 61 is a comparator, 63 is a translucent calculation part. Further, the pixel depiction part 60 includes an overlap inhibition flag detection part 64 for detecting an overlap inhibition flag (described in detail in the following) for inhibiting overlap of polygons.

Here, the overlap inhibition flag will be described.

The present embodiment, in addition to a plurality of polygons (with textures) as construction factors of a single object, includes a flag (called an overlap inhibition flag) representing whether or not these polygons may be overlappingly depicted. This overlap inhibition flag is previously set according to a displayed body (model formed of a plurality of polygons) or a displayed scene (including a plurality of displayed bodies). That is, there is a possibility that some color variation or the like occurs depending on the image depiction process, however, in practice, when it is determined to be sufficiently negligible in view of the scene setting, the overlap inhibition flag is set to "0". Therefore, when the above flag is not detected by the overlap inhibition flag detection part 64 in FIG. 2, the translucent polygon formation process is not executed which will be described in detail later with reference to FIGS. 3 and 4, but an ordinary (prior art) rendering processing is immediately executed.

Next, the entire operation of FIG. 2 will be described. The pixel depiction part 60 performs depiction processing of respective pixels in the polygon according to polygon information supplied from the CPU part 4. For example,color information, vertex coordinates of polygon and the like are inputted as the polygon information. Further, when texture mapping is performed, a texture memory 12 is referred to. The texture memory 12 stores a "texture" which is a two-dimensional image stuck to the polygon. Then, X, Y and Z coordinates, texture coordinates, brightness information, normal line vector information and the like of respective pixels in the polygon are determined in the pixel depiction part 60. The determined X, Y and Z coordinates are outputted as pixel addresses to the Z buffer and the frame buffer 10.

Further, Z coordinates are supplied as depth information $Zp$ of a newly obtained pixel to the comparator 61. To the comparator 61, a depth information $Z_B$ already stored in the Z buffer 8 is also read and supplied. When $Zp < Z_B$, in response to the judgment output from the comparator 61, the pixel depiction part 60 overwrites $Zp$ at a position designated by the corresponding pixel address of the Z buffer. In the present embodiment, a rendering method for classifying the depth of polygon by Z buffer algorithm using the Z buffer 8 is described as an example, however, the present invention is not limited to the above method, and another rendering method may be used.

The translucent calculation part 63 performs the above-described translucent calculation on the basis of image information from the pixel depiction part 60, the translucent coefficient and image information stored in the frame buffer 10. The translucent processed image information is again stored in the frame buffer 10. Here, the translucent coefficient may be determined by one of the blend (interpolation) method (blending technique), the addition method (addition technique) and the filter method (filtering technique) or a combination of these methods.

Figure 3:
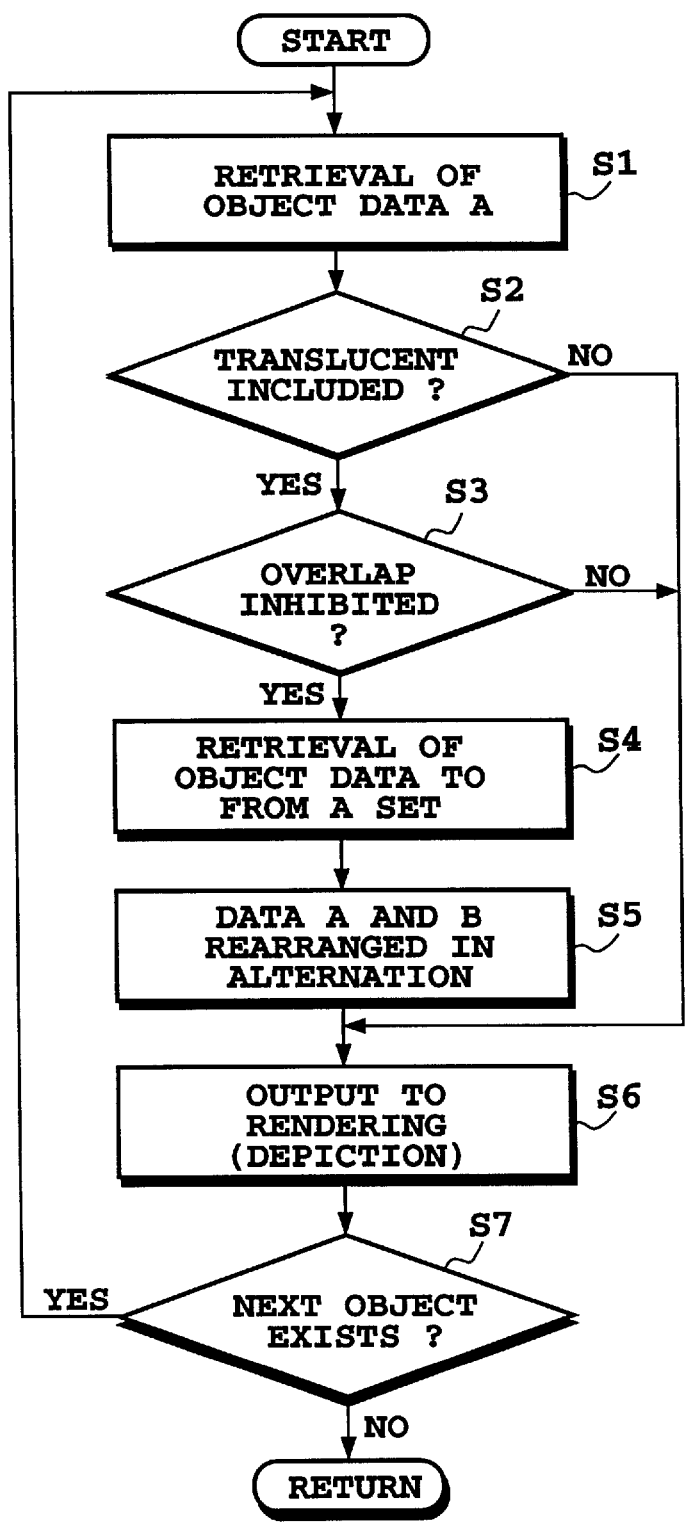
FIG. 3 is a flow chart showing processing procedure in the present embodiment.

FIG. 3 is a flow chart showing the image depiction processing procedure in the present embodiment. The image depiction procedure shown in this figure can be stored in the form of a program on a detachable storage and executed at any time as necessary on each apparatus.

Figure 4:
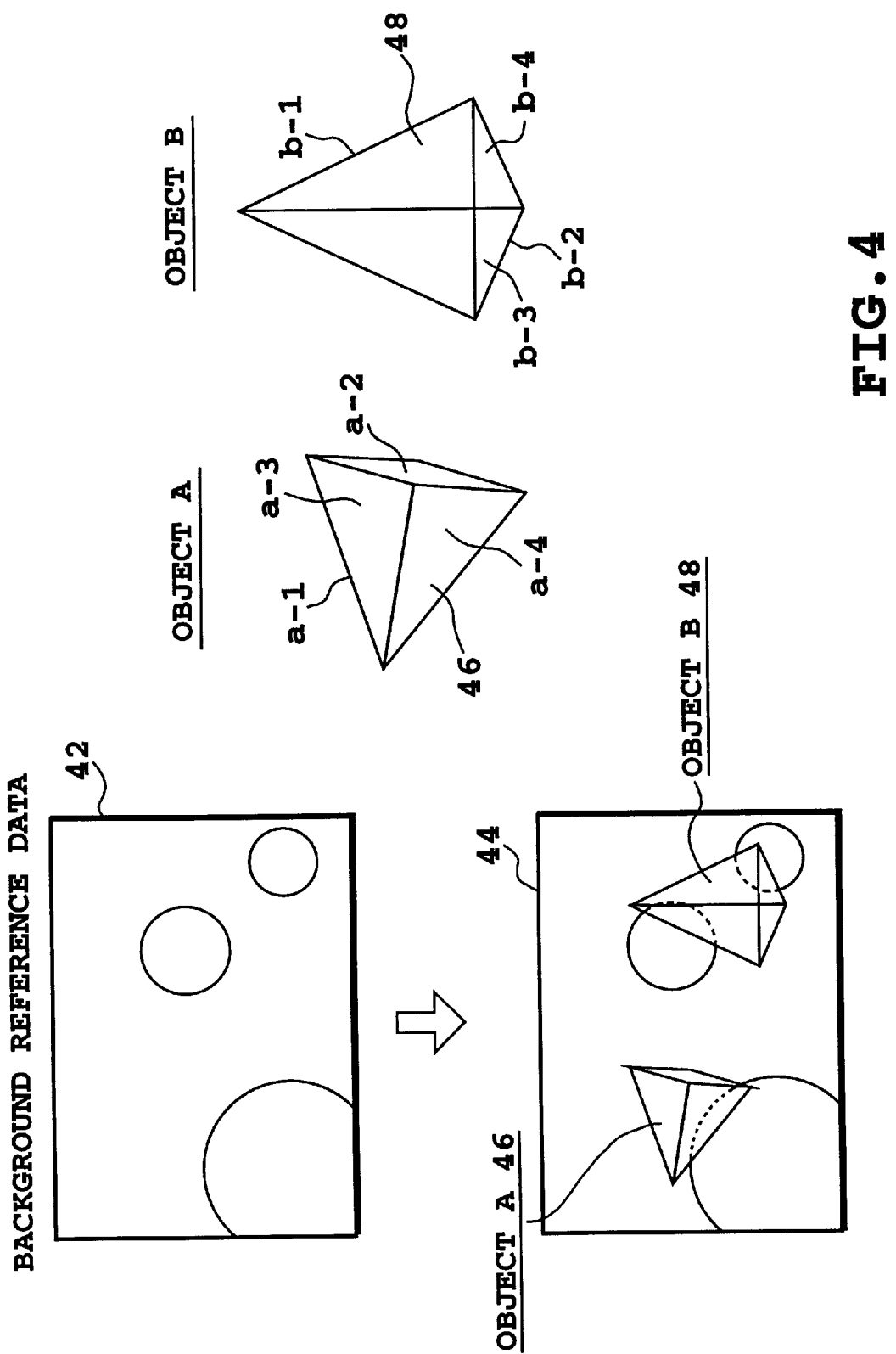
FIG. 4 is a schematic diagram for explaining FIG. 3.
Figure 5:
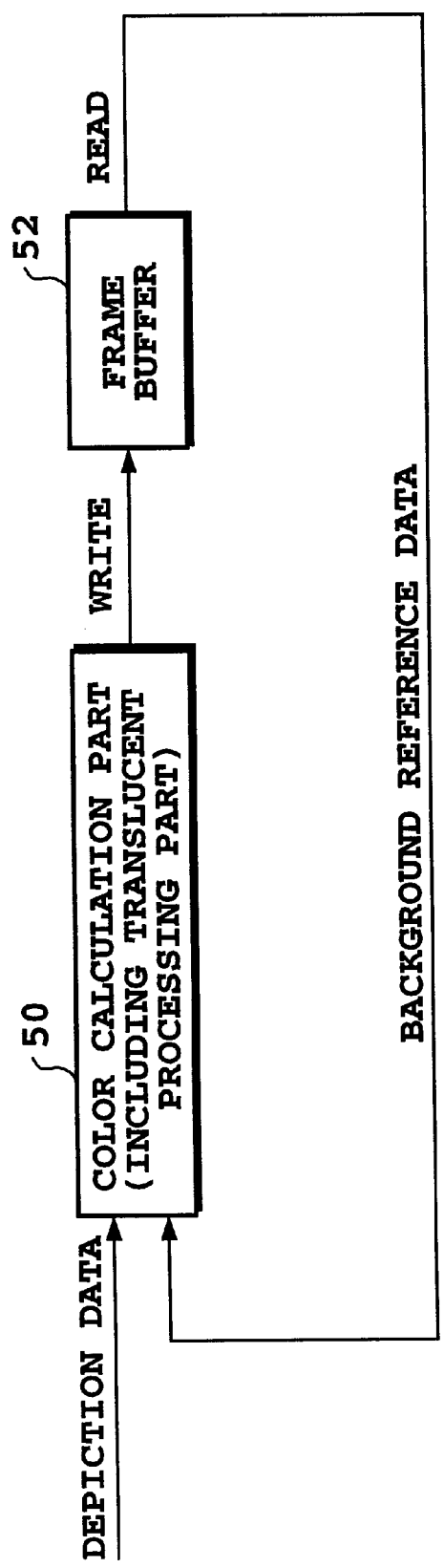
FIG. 5 is a block diagram for explaining a prior art.

FIG. 4 is a schematic diagram for explaining the flow chart shown in FIG. 3.

First, a precondition of processing in FIG. 3 will be described with reference to FIG. 4. Here, as depicted in FIG. 4, an example in which two objects A 44 and B 46 are displayed as a set on the background reference data 42. Therefore, although not shown in the figure, it is also possible to display three or more objects as a set.

Precondition 1

Polygons (in FIG. 4, a-1 to a-4, b-1 to b-4) of respective objects (in FIG. 4, objects A 46 and B 48) are required to have a possibility to overlap with each other. In other words, if there is no possibility of overlap, it is not necessary to apply the present invention.

However, even if overlapped in effect, when the designer determines that a substantial visual problem does not occur in practice, the above-described overlap inhibition flat maybe set to "0". In this case, as shown in step S3 in FIG. 3, the control goes to the ordinary rendering processing.

Precondition 2

It is previously known that a plurality of objects (in FIG. 4, two objects A 46 and B 48) do not overlap on the display screen. This condition is not determined mathematically, but determined as an established fact at the time when a game or the like is fabricated. Such cases include, for example, when the same moving body is displayed as two images by changing the view point, and when the scene setting is previously made so that the plurality of objects do not overlap even if the view point is moved in any direction.

When the above preconditions are satisfied, for example, in the case of FIG. 4, when the polygon depiction order is set as shown below in the translucent calculation part 63, there is almost no possibility that depiction data of overlapped addresses exist in the process of translucent calculation.

Order (1) polygon a-1
Order (2) polygon b-1
Order (3) polygon a-2
Order (4) polygon b-2
Order (5) polygon a-3
Order (6) polygon b-3
Order (7) polygon a-4
Order (8) polygon b-4

Under such preconditions, respective steps of FIG. 3 will be described.

First, in step S1, data A (that is, including data of polygons a-1 to a-4) as data of the first object (corresponding to object A46 in FIG. 4) is retrieved.

In step S2, a determination is made as to whether or not a translucent polygon is included, when it is determined to be not included, the control goes to the rendering processing in step S6. On the other hand, when it is determined to be included, the control proceeds to next step S3.

In step S3, a determination is made as to whether or not overlap processing is inhibited in an object, that is, whether or not the overlap inhibition flag is set. When the overlap processing is not inhibited, the control proceeds to step S6 where the ordinary rendering processing is performed. On the other hand, when the overlap processing is inhibited, the control proceeds to step S4.

In step S4, data B (that is, including data of polygons b-1 to b-4) as data of the object to be a set with the first object (corresponding to object B 48 in FIG. 4) is retrieved.

In step S5, con tents of the two data A and B are rearranged according to the above order (1) to (8).

By the above steps S1 to S5 pre-processing of rendering is completed.

In step S6, rendering processing is started.

In step S7, a determination is made as to whether or not a further object exists. When a third or more objects exist, the above steps S1 to S6 are repeated.

Other Embodiments

In translucent polygon depiction, it is also possible to depict a polygon which does not overlap the translucent polygon in an empty cycle after foregoing background reference.

In other embodiments, the present invention can be embodied as computer program products to be used in computer systems. It is obvious to an ordinary skill in the art that the program defining the functions of the present invention can be introduced in many forms in computers. Examples of these forms include (a) information forms permanently held in read-only storage media useable in a computer (for example, ROM, CD-ROM disk, DVD-ROM disk readable by an input/output device of a computer), (b) information forms previously held in writable storage media useable in a computer (for example, floppy disk and hard disk drive apparatus), (c) information forms transmitted to a computer through transmission media such as a telephone line through a modem or a network like computer data signals carried, for example, on digital data stream or a carrier wave, however, the present invention is not limited to these forms. Therefore, a medium holding an instruction readable by a computer for controlling the image generation method of the present invention provides another embodiment of the present invention.

As described above, with the present invention, even by a simple construction, it is possible to provide an image generation apparatus, an image generation method and a storage medium storing an image generation program enabling exact and rapid translucent processing.

That is, with the present invention, when a depiction data of overlapping address exists in data under color calculation, the prior art problem that a color calculation result including exact translucent processing is not obtained can be prevented. Further, with the present invention, since it is not necessary to construct a more complex color calculation processing circuit, reduction of cost and processing time can be achieved.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image generation apparatus for making rendering of a plurality of foreground objects, under a condition that said plurality of foreground objects displayed on a screen are not displayed overlappingly with each other, comprising:

input means for taking in first data representing a first foreground object having a plurality of areas and second data representing a second foreground object, which first and second foreground objects are to be rendered for display;

determination means for determining whether or not at least two of the areas in said first foreground object to be translucently processed have overlapping a same pixel to be processed;

rearrangement means responsive to the determination means for rearranging said first data and said second data when an affirmative determination is made by said determination means so that depiction processing of said first foreground object and said second foreground object is performed in alternation;

wherein rendering processing is performed on the basis of said rearranged data.

2. The image generation apparatus as claimed in claim 1, wherein when a negative determination is made by said determination means, rendering processing is immediately executed without first taking in the second data through said input means and said rearrangement means.

3. The image generation apparatus as claimed in claim 1, wherein said determination means performs the determination according to specific information previously set for each foreground object.

4. An image generation method for making rendering of a plurality of foreground objects, under a condition that said plurality of foreground objects displayed on a screen are not displayed overlappingly with each other, comprising:

taking in first data representing a first foreground object having at least two areas;

when an area to be translucently processed exists in said first foreground object, determining whether or not at least two of the areas are to be translucently processed and have an overlapping pixel to be processed;

when an affirmative determination is made by said determination step, taking in second data representing a second foreground object to form a set with said first foreground object;

rearranging said first foreground object and said second foreground object so that depiction processing of said first foreground object and said second foreground object is performed in alternation; and performing rendering processing on the basis of said rearranged data.

5. The image generation method as claimed in claim 4, wherein when a negative determination is made by said determination step, rendering processing is immediately executed without first taking in the second data.

6. The image generation method as claimed in claim 4, wherein said determination step performs the determination according to specific information previously set for each foreground object.

7. A computer useable medium recorded with a program for executing steps in a computer for making rendering of a plurality of foreground objects, under a condition that said plurality of foreground objects displayed on a screen are not displayed overlappingly with each other, said steps comprising:

taking in first data representing a first foreground object having at least two areas; when an area to be translucently processed exists in said first foreground object, determining whether or not at least two of the areas are to be translucently processed and have an overlapping pixel to be processed;

when an affirmative determination is made by said determination step, taking in second data representing a second foreground object to form a set with said first foreground object;

rearranging said first foreground object and said second foreground object so that depiction processing of said first foreground object and said second foreground object is performed in alternation; and performing rendering processing on the basis of said rearranged data.

8. A computer data signal embodied in a digital data stream including a program data for executing steps in a computer for making rendering of a plurality of foreground objects, under a condition that said plurality of foreground objects displayed on a screen are not displayed overlappingly with each other, said steps comprising:

taking in first data representing a first foreground object having at least two areas;

when an area to be translucently processed exists in said first foreground object, determining whether or not at least two of the areas are to be translucently processed and have an overlapping pixel to be processed;

when an affirmative determination is made by said determination step, taking in second data representing a second foreground object to form a set with said first foreground object;

rearranging said first foreground object and said second foreground object so that depiction processing of said first foreground object and said second foreground object is performed in alternation; and performing rendering processing on the basis of said rearranged data.

9. A computer data signal embodied in carrier wave including a program data for executing steps in a computer for making rendering of a plurality of foreground objects, under a condition that said plurality of foreground objects displayed on a screen are not displayed overlappingly with each other, said steps comprising:

taking in first data representing a first foreground object having at east two areas; when an area to be translucently processed exists in said first foreground object, determining whether or not at least two of the areas are to be translucently processed and have an overlapping pixel to be processed;

when an affirmative determination is made by said determination step, taking in second data representing a second foreground object to form a set with said first foreground object;

rearranging said first foreground object and said second foreground object so that depiction processing of said first foreground object and said second foreground object is performed in alternation; and performing rendering processing on the basis of said rearranged data.

* * * * *